US011839576B2

(12) United States Patent
Traxinger et al.

(10) Patent No.: US 11,839,576 B2
(45) Date of Patent: Dec. 12, 2023

(54) DYNAMIC ROTARY LOCKING MEMBER

(71) Applicant: Sunrise Medical (US) LLC, Fresno, CA (US)

(72) Inventors: Samuel D. Traxinger, Fresno, CA (US); Jefferey Bashian, Clovis, CA (US)

(73) Assignee: Sunrise Medical (US) LLC, Fresno, CA (US)

( * ) Notice: Subject to any disclaimer, the term of this patent is extended or adjusted under 35 U.S.C. 154(b) by 580 days.

(21) Appl. No.: 16/973,252

(22) PCT Filed: Jun. 10, 2019

(86) PCT No.: PCT/US2019/036364
§ 371 (c)(1),
(2) Date: Dec. 8, 2020

(87) PCT Pub. No.: WO2019/237113
PCT Pub. Date: Dec. 12, 2019

(65) Prior Publication Data
US 2021/0244583 A1    Aug. 12, 2021

Related U.S. Application Data

(60) Provisional application No. 62/788,229, filed on Jan. 4, 2019, provisional application No. 62/682,510, filed on Jun. 8, 2018.

(51) Int. Cl.
*B60G 17/005* (2006.01)
*F16C 11/10* (2006.01)
(Continued)

(52) U.S. Cl.
CPC ............ *A61G 5/1078* (2016.11); *B60B 33/04* (2013.01); *B60G 17/005* (2013.01);
(Continued)

(58) Field of Classification Search
CPC .............. B60G 17/005; B60G 2200/13; B60G 2204/46; B60G 2300/24; F16C 11/103; F16C 2326/05; F16C 2326/20
See application file for complete search history.

(56) References Cited

U.S. PATENT DOCUMENTS 4,361,216 A    11/1982  Overbeek
5,145,042 A     9/1992  MacPherson
(Continued)

OTHER PUBLICATIONS

Partial European Search Report, dated Jul. 28, 2021.
PCT/US2019/036364 ISR and Written Opinion dated Aug. 26, 2019.

*Primary Examiner* — Tony H Winner
(74) *Attorney, Agent, or Firm* — MacMillan, Sobanski & Todd, LLC

(57) ABSTRACT

A selectively locking rotational bearing element includes at least one bearing element supporting an outer race for rotational movement and a plurality of locking elements disposed circumferentially about an inner surface of the outer race. An actuator selectively moves the plurality of locking elements into engagement with the outer race to restrict rotational movement of the outer race and selectively move the plurality of locking elements away from engagement with the outer race such that the outer race is free to rotate relative to the locking elements.

20 Claims, 13 Drawing Sheets

(51) Int. Cl.
*F16D 11/16* (2006.01)
*A61G 5/10* (2006.01)
*B60B 33/04* (2006.01)

(52) U.S. Cl.
CPC ............ *F16C 11/103* (2013.01); *F16D 11/16* (2013.01); *B60G 2200/13* (2013.01); *B60G 2204/46* (2013.01); *B60G 2300/02* (2013.01); *F16C 2326/05* (2013.01); *F16C 2326/20* (2013.01)

(56) References Cited

U.S. PATENT DOCUMENTS

| | | | |
|---|---|---|---|
| 5,718,313 | A | 2/1998 | Sekine |
| 5,992,592 | A | 11/1999 | Showalter |
| 6,224,965 | B1 * | 5/2001 | Haas .................... H05K 3/0032 |
| | | | 428/209 |
| 6,244,965 | B1 | 6/2001 | Klecker et al. |
| 6,851,711 | B2 | 2/2005 | Goertzen et al. |
| 7,083,195 | B2 | 8/2006 | Goertzen et al. |
| 7,314,220 | B2 | 1/2008 | Turturiello et al. |
| 8,776,314 | B2 * | 7/2014 | Hofrichter .......... B60B 33/0057 |
| | | | 16/35 R |
| 8,910,975 | B2 | 12/2014 | Bekoscke et al. |
| 9,827,823 | B2 | 11/2017 | Bekoscke et al. |
| 9,925,100 | B2 | 3/2018 | Goertzen et al. |
| 2003/0226415 | A1 | 12/2003 | Baker et al. |
| 2004/0094944 | A1 | 5/2004 | Goertzen et al. |
| 2005/0151360 | A1 | 7/2005 | Bertrand et al. |
| 2008/0006499 | A1 | 1/2008 | Joki |
| 2017/0100962 | A1 * | 4/2017 | Kloss .................. B60B 33/0092 |
| 2017/0119607 | A1 | 5/2017 | Derenne et al. |
| 2017/0138416 | A1 * | 5/2017 | Lee ........................ F16D 23/14 |
| 2017/0343061 | A1 | 11/2017 | Campton |
| 2018/0073575 | A1 | 3/2018 | Hixenbaugh et al. |
| 2022/0162793 | A1 * | 5/2022 | Papsdorf ............... D06F 39/125 |
| 2023/0212884 | A1 * | 7/2023 | Xiang .................. E05B 15/0033 |
| | | | 192/36 |

* cited by examiner

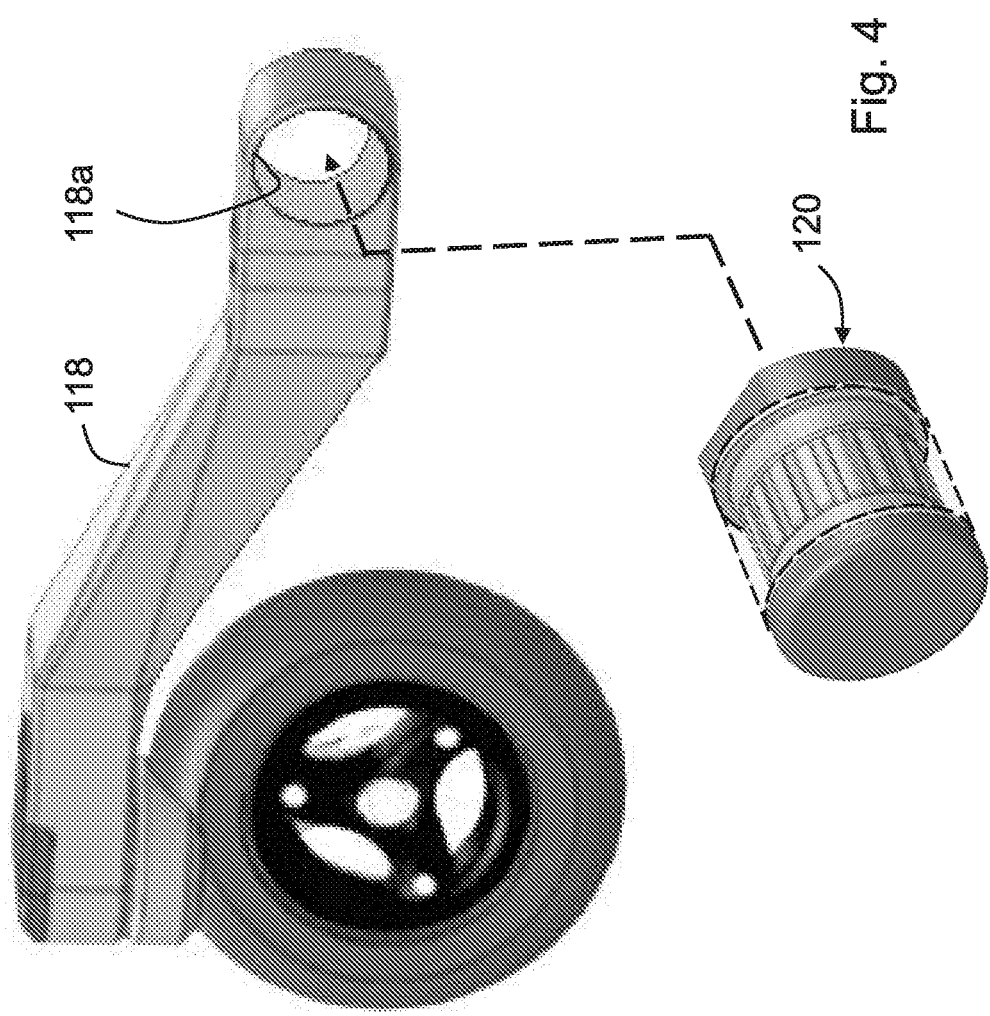

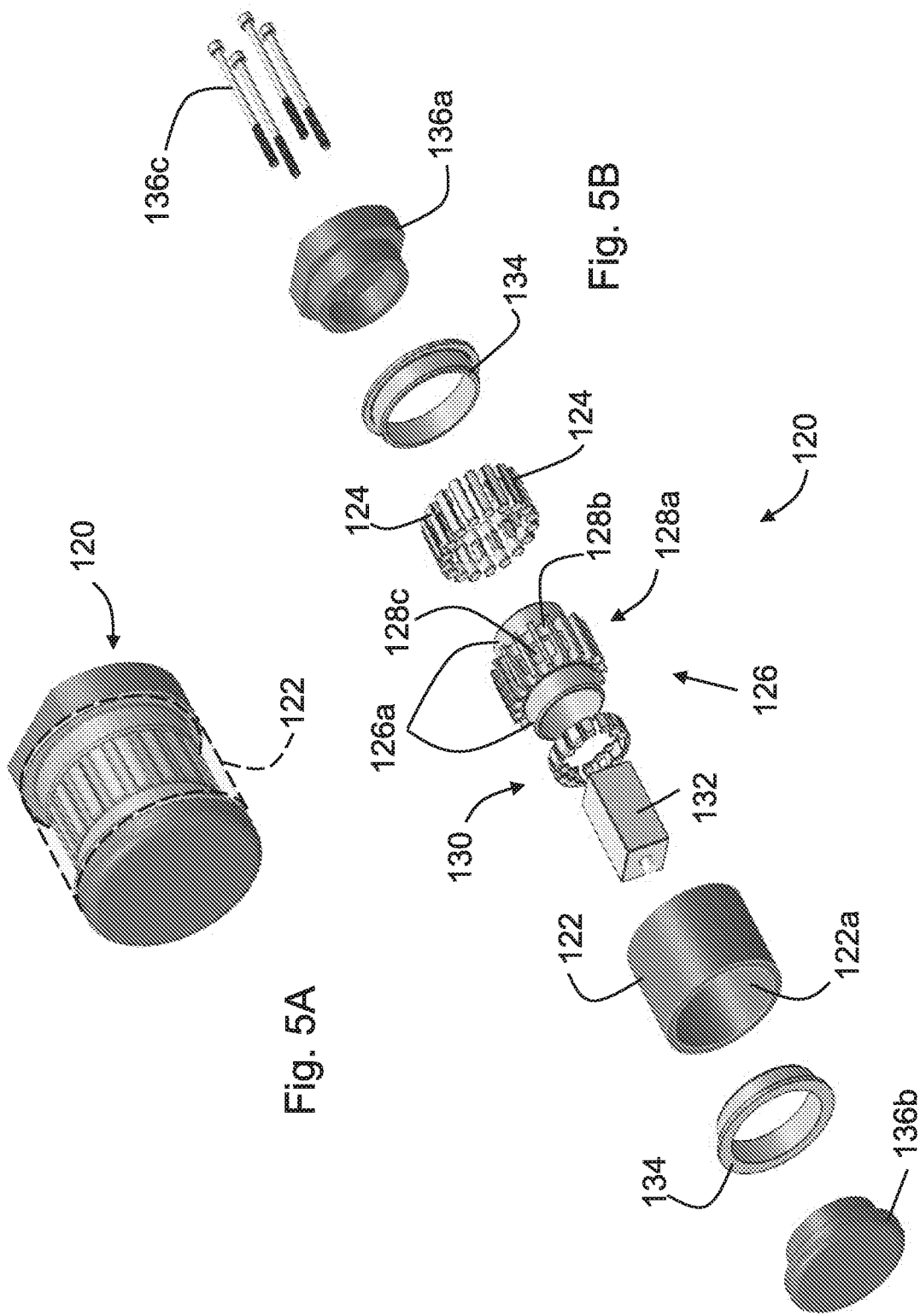

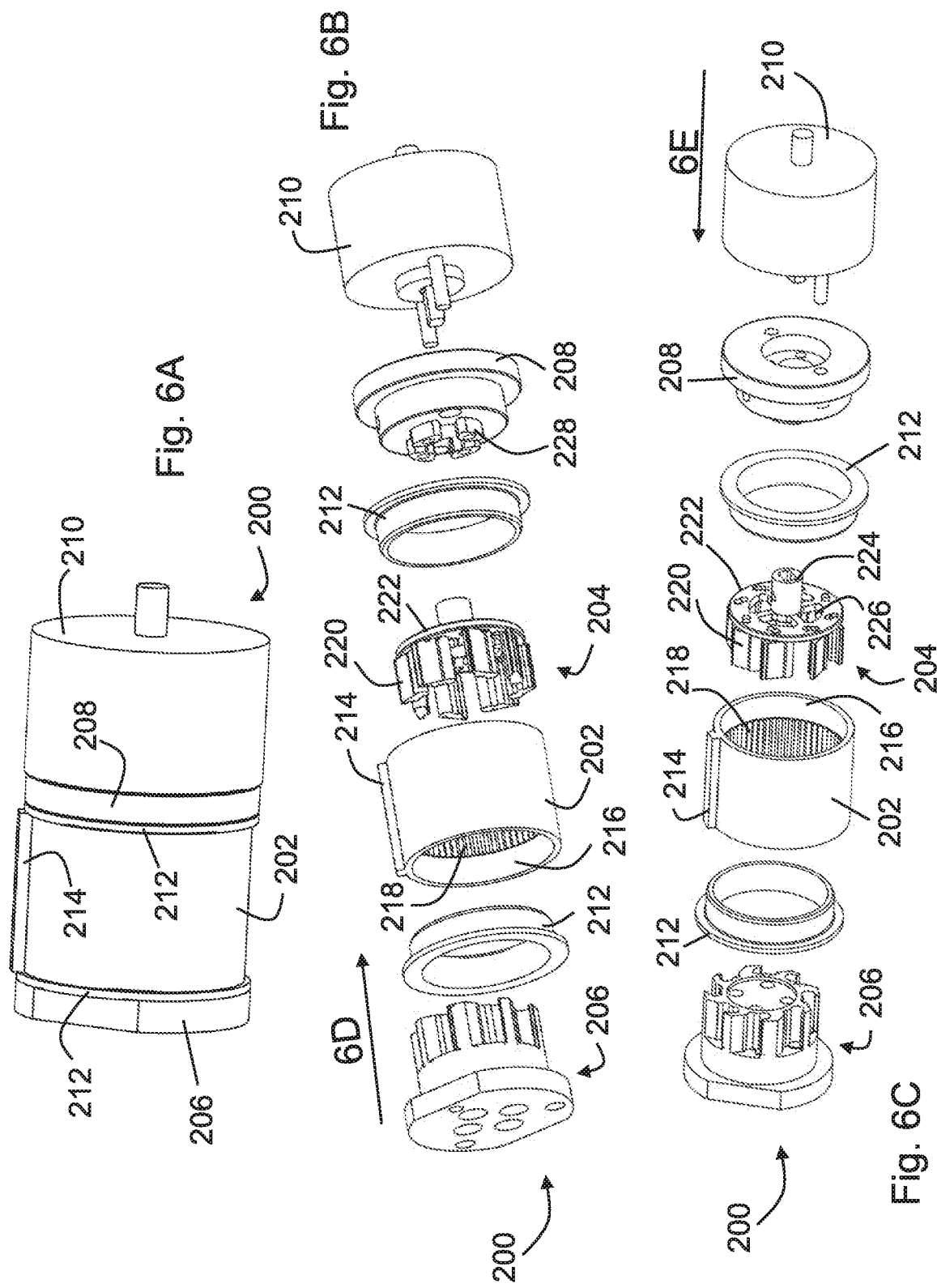

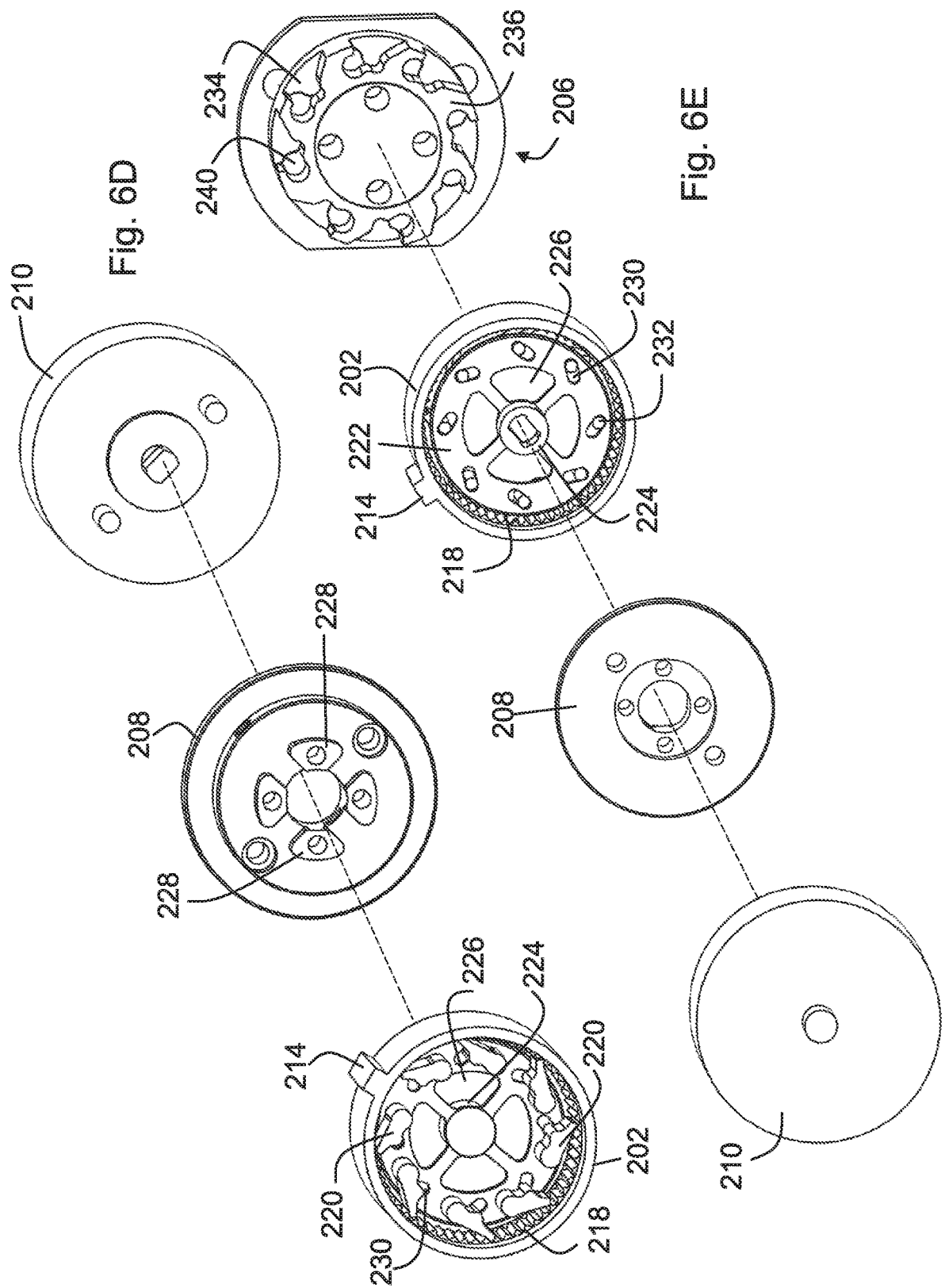

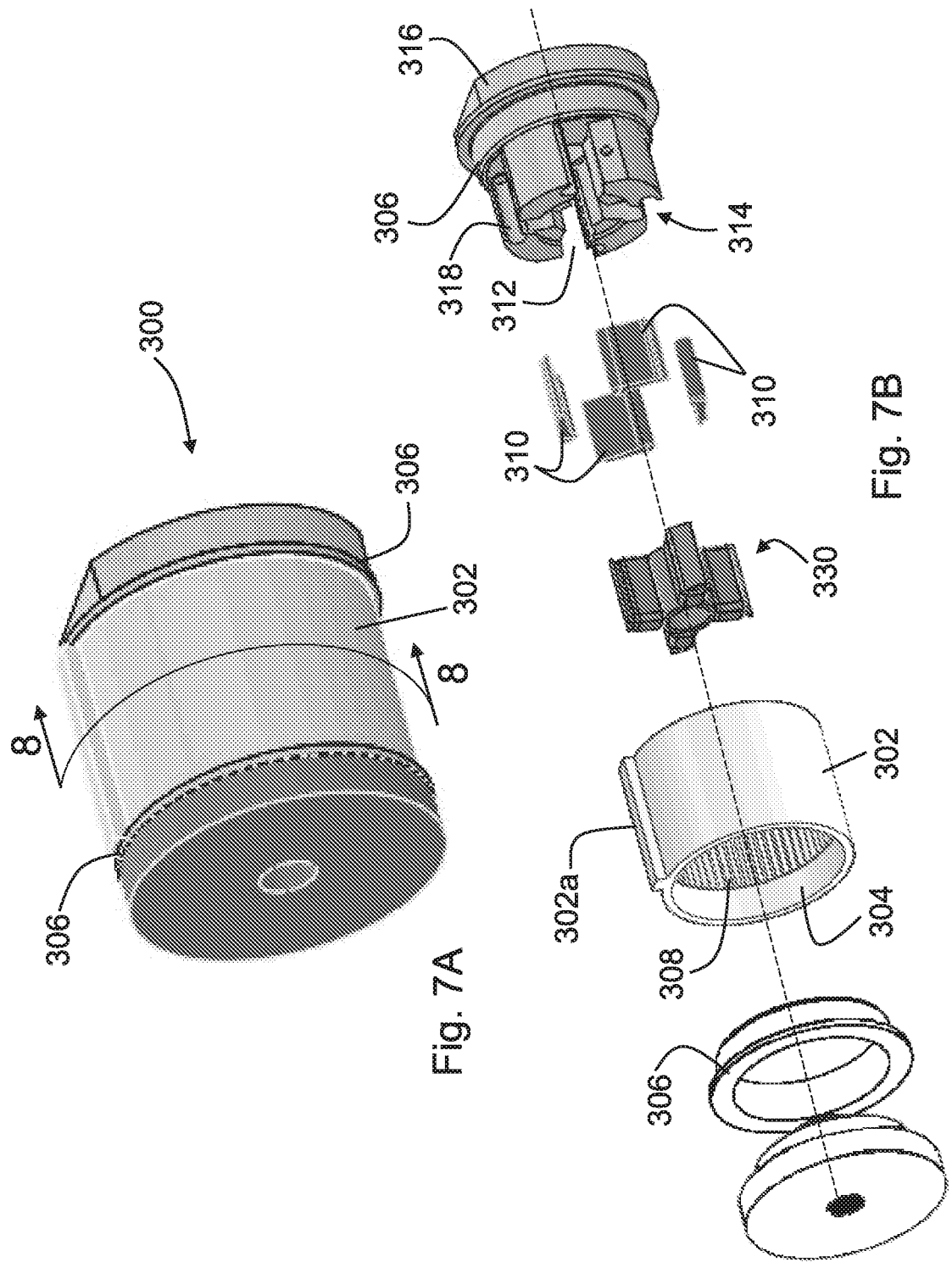

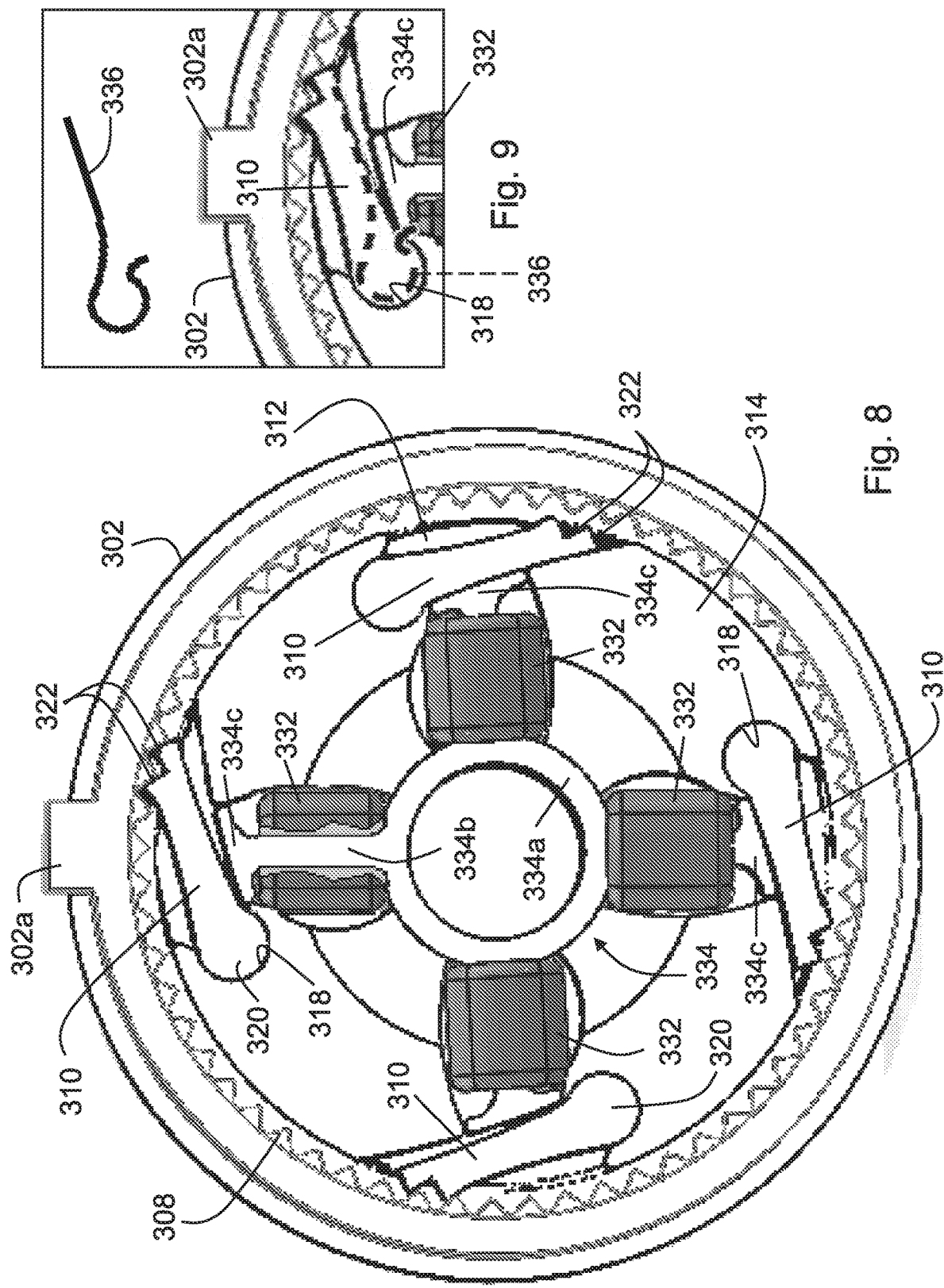

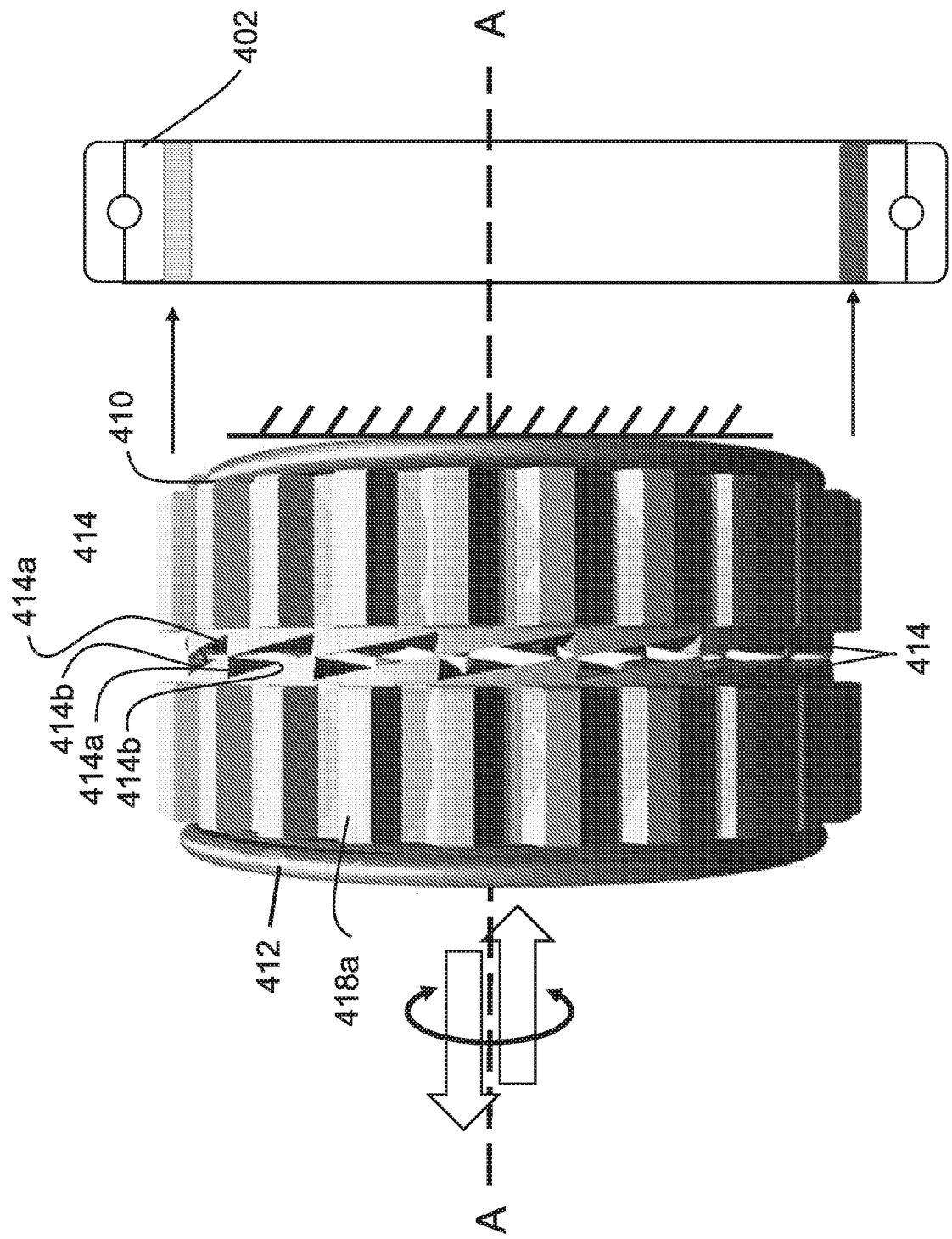

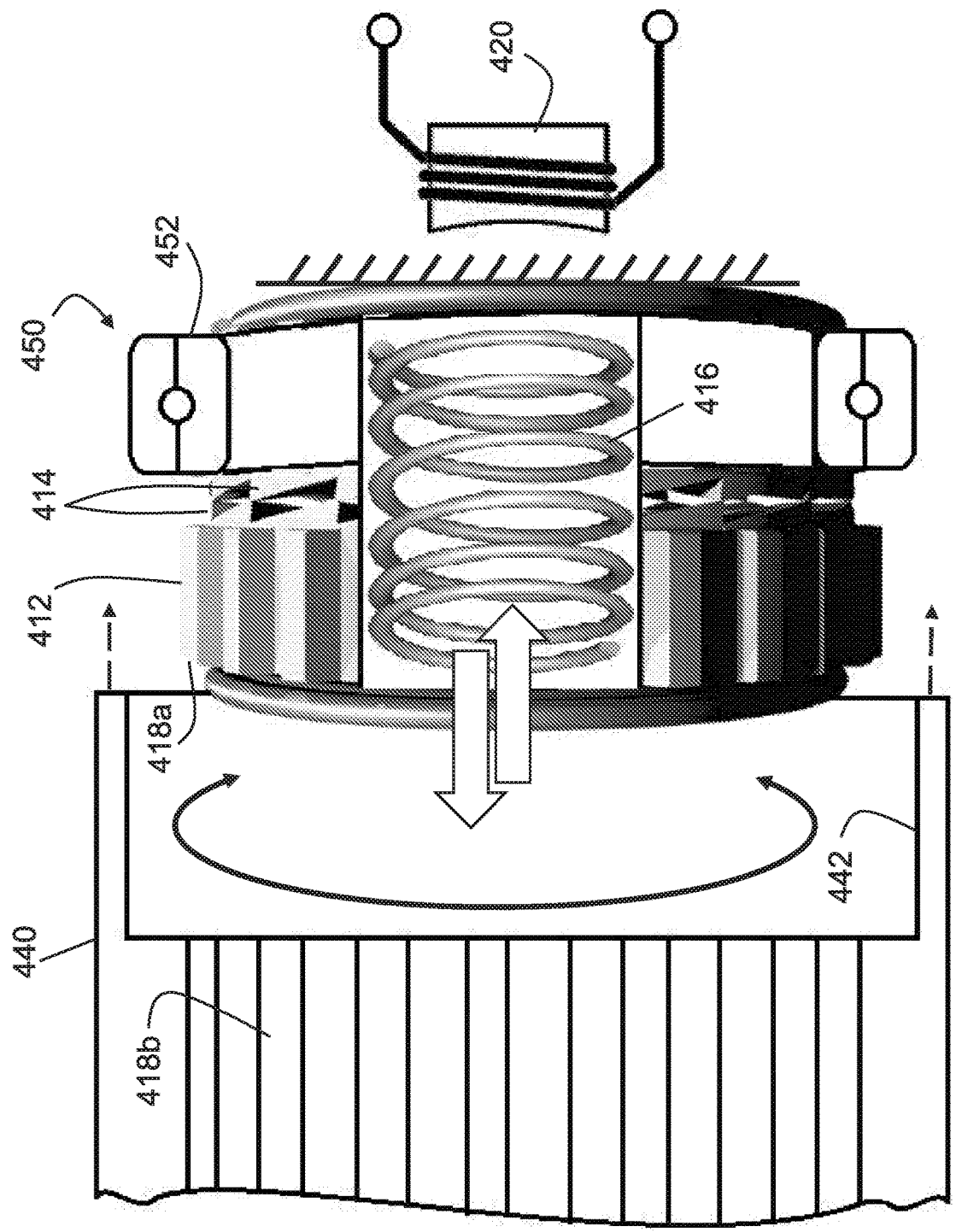

DYNAMIC ROTARY LOCKING MEMBER

CROSS-REFERENCE TO RELATED APPLICATIONS

This application is the National Phase of International Application PCT/US2019/036364, filed Jun. 10, 2019 which designated the U.S. and that International Application was published under PCT Article 21(2) on Dec. 12, 2019 as International Publication Number WO 2019/237113 A1. PCT/US2019/036364 claims priority to U.S. Provisional Patent Application No. 62/682,510 filed Jun. 8, 2018 and U.S. Provisional Patent Application No. 62/788,229, filed Jan. 4, 2019. The disclosures of these applications are incorporated herein by reference in their entirety.

BACKGROUND OF THE INVENTION

This invention relates in general to suspension control members for selectively arresting or permitting movement of a suspension member relative to a support structure, such as a frame. In particular, this invention relates to a rotary locking member to selectively control movement of a caster arm relative to a wheelchair frame.

Wheelchair suspension systems typically include caster arms to provide steering movement and reactions to fore/aft and/or side-to-side movement of the wheelchair base in response to acceleration and deceleration inputs or turning inputs by the user. Wheelchair stability is often associated with control of movement of the base in response to these fore and aft and/or side to side or yaw movements. Since the caster arms typically extend in the forward or rearward direction, or both directions for mid-wheel drive applications, these structures provide a suitable reaction point to counteract the tipping and/or pitching effects associated with forward or rearward accelerations and decelerations.

Caster arm reactions to, for example, fore/aft movement of the base have been controlled by suspension springs, interconnecting linkages (particularly between front and rear caster arms of mid-wheel drive wheelchairs), and clutching or braking structures. Clutching or braking structures have employed many types of mechanisms, such as sprag or overrunning clutches, magnetorheological clutch devices, and caliper-type braking devices, as examples. These devices are either limited in the ability to selectively control movement in two directions or are bulky and difficult to package in a caster arm environment. Thus, it would be desirable to provide a device to control caster arm movement in response to fore/aft tipping movements that can be selectively engaged, responsive to movement in either the fore or aft tipping directions, and is compact for easier packaging.

SUMMARY OF THE INVENTION

This invention relates to suspension control members for selectively arresting or permitting movement of a suspension member relative to a support structure, such as a frame. In particular, this invention relates to a locking member to selectively control movement of a caster arm relative to a wheelchair frame.

A selectively locking rotational bearing element includes at least one bearing element supporting an outer race for rotational movement and a plurality of locking elements disposed circumferentially about an inner surface of the outer race. An actuator is responsive to a signal and selectively moves the plurality of locking elements into engagement with the outer race to restrict rotational movement of the outer race and selectively move the plurality of locking elements away from engagement with the outer race such that the outer race is free to rotate relative to the locking elements. In certain embodiments and aspects of the invention, a sensor provides the signal to the actuator to initiate movement of the plurality of locking elements into engagement or away from engagement with the outer race.

In a first aspect of the invention, the plurality of locking elements are each supported for pivotal movement on a pivot axle. The actuator engages a portion of the locking elements for movement into and away from engagement. The plurality of locking elements each include a contact surface that directly engages the inner surface of the outer race to restrict rotational movement of the outer race. The actuator may be, for example, an electric motor, an electric motor and a gear, a solenoid, or an electromagnet. In certain examples, the plurality of locking elements include a tooth segment that engages the gear and may also a stop to limit movement of the locking elements away from engagement.

In a second aspect of the invention, the plurality of locking elements is a plurality of sprag elements, where the sprag elements having an upper contact surface that engages an inner surface of the outer race and a lower contact surface that engages a load surface of an inner race. The sprag elements are supported for pivotal movement in a cage positioned on the outer surface of the inner race. Further, the inner race includes a drive window and the actuator is an actuation sleeve configured to mate with a corresponding drive profile of the sprag element through the drive window. The actuation sleeve also includes a drive element that transmits rotary motion from a drive mechanism to sprag elements.

In yet a third aspect of the invention, the outer race includes at least one bearing surface in contact with the at least one bearing element. A locking spline section extends around an inner surface of the outer race. A plurality of pawls each have a latch face that engages at least one spline tooth of the locking spline section. The pawls are moved by a pawl actuator that includes a pawl driver configured to engage a pawl driving element to actuate the pawls into and away from engagement with the locking spline section. The pawls may further include one of a stop window or a stop lug and an end cap includes the other of the stop window or stop lug. The stop windows are radially larger than the stop lugs to permit movement of the pawl actuator relative to the end cap.

In one specific embodiment, the pawl driver is a slot with a radially oriented component and a circumferentially oriented component and the pawl driving element is a pin that extends into the slot, and wherein rotational movement of the slot moves the pin causing the pawls to move into and away from engagement with the locking spline section. In yet another specific embodiment, the at least one bearing element is supported by an inner race assembly. The inner race assembly includes a cage portion defining a plurality of pockets, each of which supports one of the plurality of pawls for pivotal movement in a pivot seat while restricting circumferential movement.

In yet a fourth aspect of the invention, the actuator includes a coil pack or an electromagnet configured to actuate each of the pawls into and away from engagement with the locking spline section. The pawls each include a ferrous component such that a magnetic field generated by the coil pack pulls the pawl from engagement with the locking spline section. The magnetic force of the coil pack also pulls against the force of a spring, the spring configured to keep the pawl forced against the locking spline section. The coil packs may be a single pack or a plurality of coil packs associated with each pawl. In one form, the coil packs are formed around a lamination stack terminating in a pawl stop. Alternatively, the spring may be configured to disengage the pawls from the locking spline section and the coil pack configured to act against the spring force to engage the pawls to the locking spline section.

The selectively locking rotational bearing element disclosed herein, in all of its variations and embodiments may have one portion, such as the inner race, fixed to a support member such as a frame of a wheelchair. Further, the outer housing of the locking member may be fixed to a caster arm that pivots through the locking member relative to the frame. This permits motion of the caster arm to be selectively stopped or arrested such that forward or rearward tipping of the wheelchair frame is prevented or minimized.

Various aspects of this invention will become apparent to those skilled in the art from the following detailed description of the preferred embodiment, when read in light of the accompanying drawings.

BRIEF DESCRIPTION OF THE DRAWINGS

FIG. 4 is an exploded, perspective view of a caster arm and a second embodiment of a dynamic rotary locking member.

FIG. 5A an enlarged view of the locking member of FIG. 4.

FIG. 5B is an exploded, perspective view of the dynamic rotary locking member of FIG. 5A.

FIG. 6A is a perspective view of a third embodiment of a dynamic rotary locking member.

FIG. 6B is an exploded, perspective view of the locking member of FIG. 6A.

FIG. 6C is the exploded perspective view of FIG. 6A, viewed from another angle.

FIG. 6D is an exploded view of selected components of the locking member of FIG. 6A, viewed along arrow 6D of FIG. 6B.

FIG. 6E is an exploded view of selected components of the locking member of FIG. 6A, viewed along arrow 6E of FIG. 6C.

FIG. 7A is a perspective view of a fourth embodiment of a dynamic rotary locking member.

FIG. 7B is an exploded, perspective view of the locking member of FIG. 7A.

FIG. 8 is a cross sectional view of the locking member of FIG. 7A, taken along line 8-8.

FIG. 9 is an enlarged view of a portion of the locking member of FIG. 8.

FIG. 10 is a side view of a fifth embodiment of an axially actuated dynamic rotary locking member in accordance with the invention.

FIG. 11 is an exploded view of a caster arm portion and the locking member of FIG. 10, in partial cross section.

DETAILED DESCRIPTION OF THE PREFERRED EMBODIMENT

Figure 1:
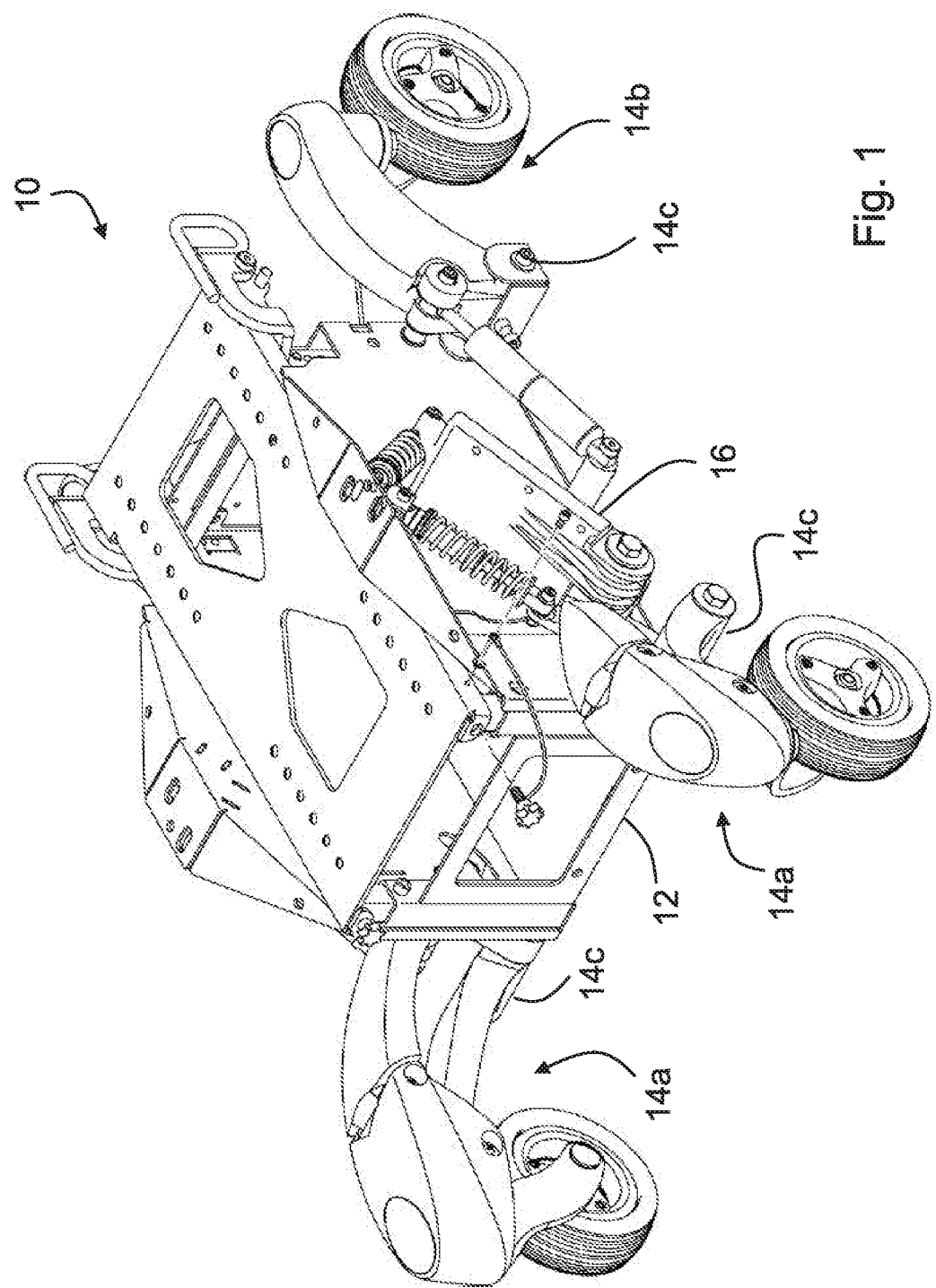
FIG. 1 is a perspective view of a wheelchair base including a selectable rotating locking member in accordance with the invention.
Figure 2:
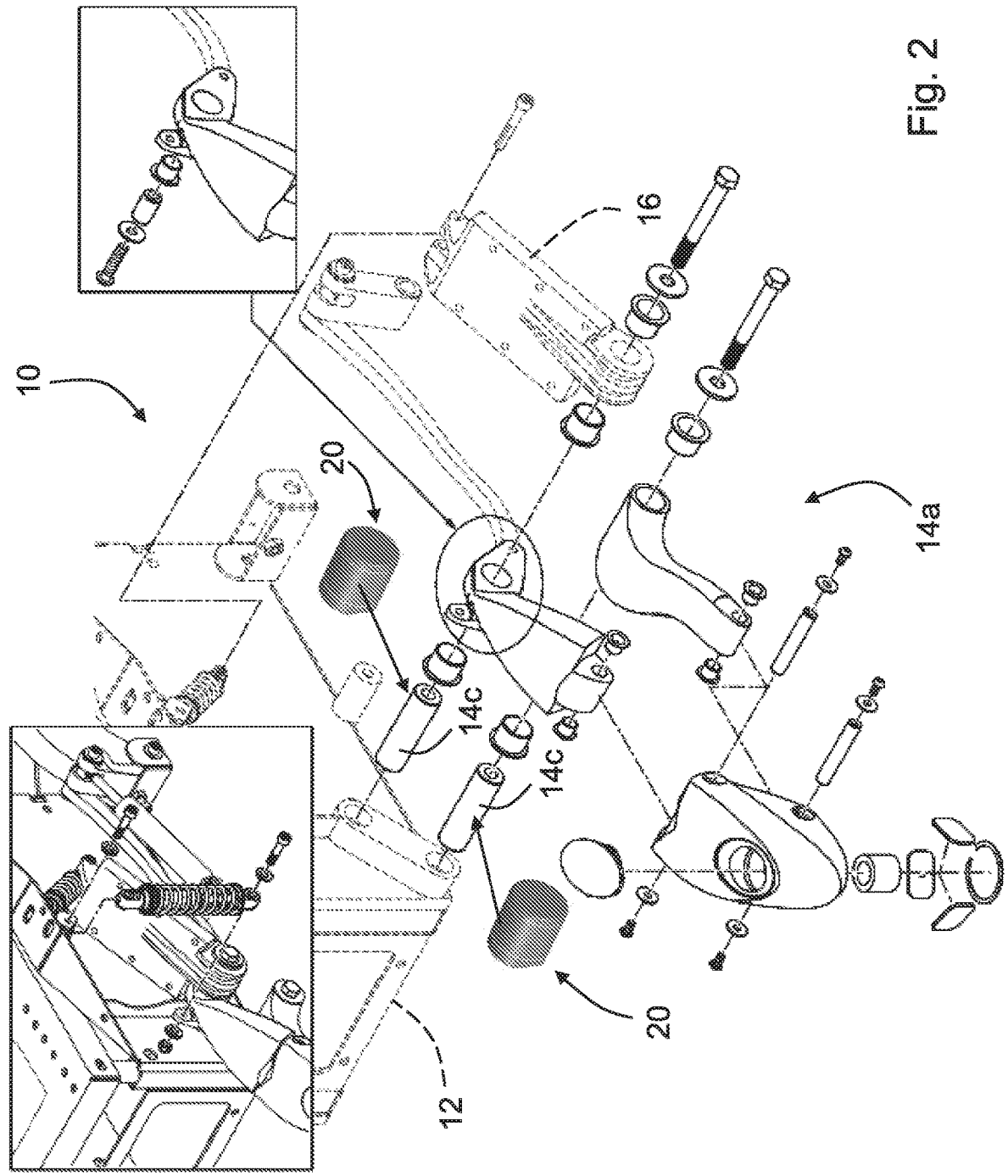
FIG. 2 is an exploded, perspective view of a caster arm assembly and locking member of the wheelchair base of FIG. 1.

Referring now to the drawings, there is illustrated in FIGS. 1 and 2 a wheelchair base and suspension system, shown generally at 10, forming an applicable environment for a dynamic rotary locking member 20 in accordance with the invention. While shown in the context of a wheelchair, the dynamic rotary locking member embodiments described herein are suitable for any application relying on bi-directional movement of one component relative to another that can be selectively started and stopped in either rotational direction. The illustrated wheelchair base is a mid-wheel drive base, though front wheel drive and rear wheel drive bases are also applicable. The wheelchair base 10 includes a frame 12 having front and rear caster arm assemblies 14a and 14b extending therefrom. The front and rear caster arm assemblies 14a, 14b are pivotally connected to the frame 12 by at least one pivot point 14c. In the illustrated embodiment, the front caster arm assemblies 14a utilize two pivot points, though such is not required. A mid-wheel drive motor mount 16 supports a drive motor and drive wheel assembly (not shown).

Figure 3A:
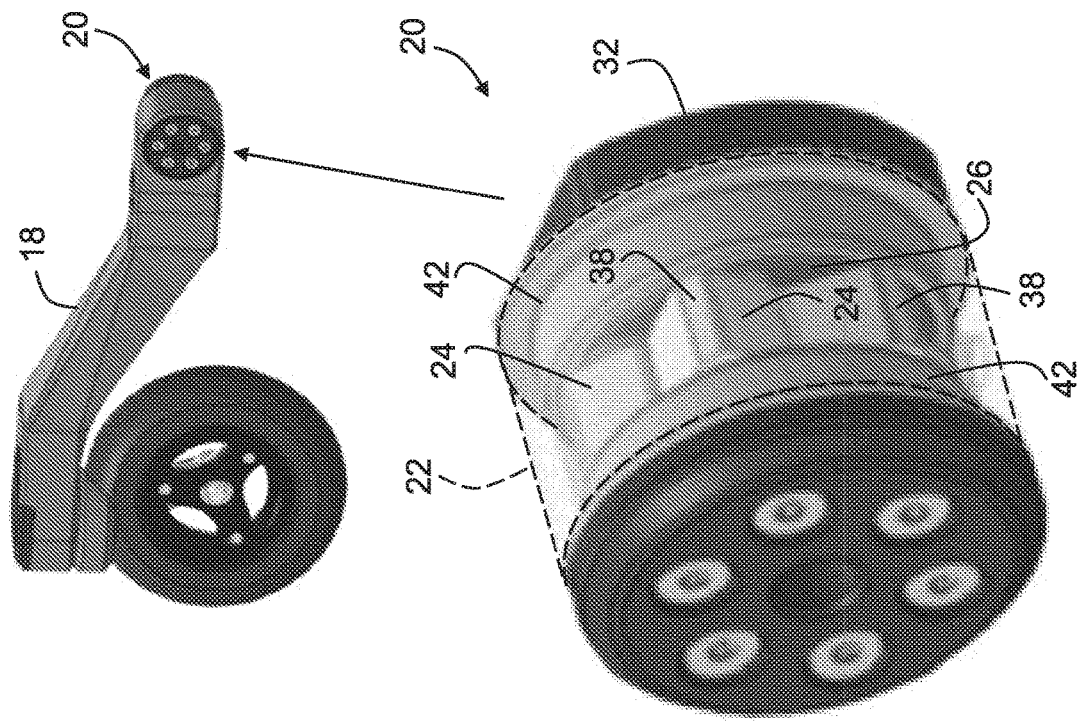
FIG. 3A is a first embodiment of a dynamic rotary locking member in accordance with the invention.
Figure 3B:
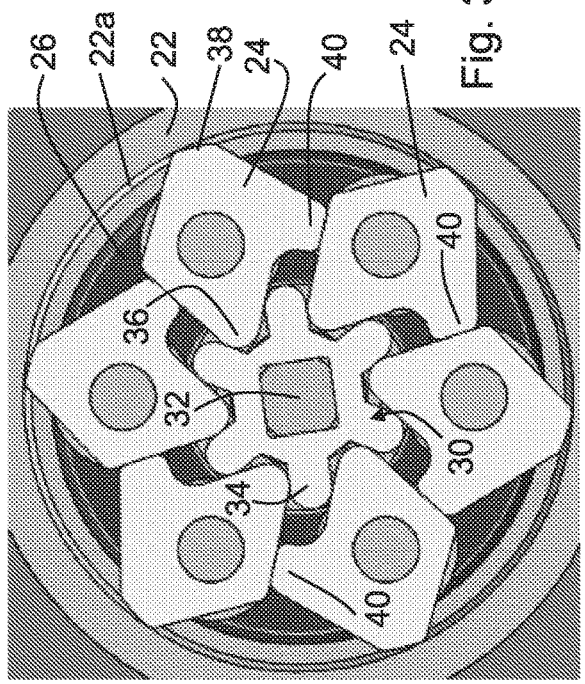
FIG. 3B is a cross sectional view of the dynamic rotary locking member of FIG. 3A in an unlocked state.
Figure 3C:
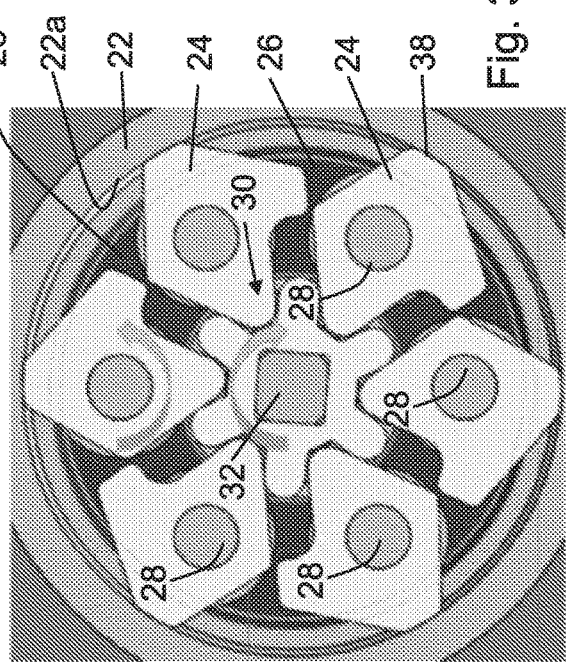
FIG. 3C is a cross sectional view of the dynamic rotary locking member of FIG. 3A in a locked state.
Figure 5C:
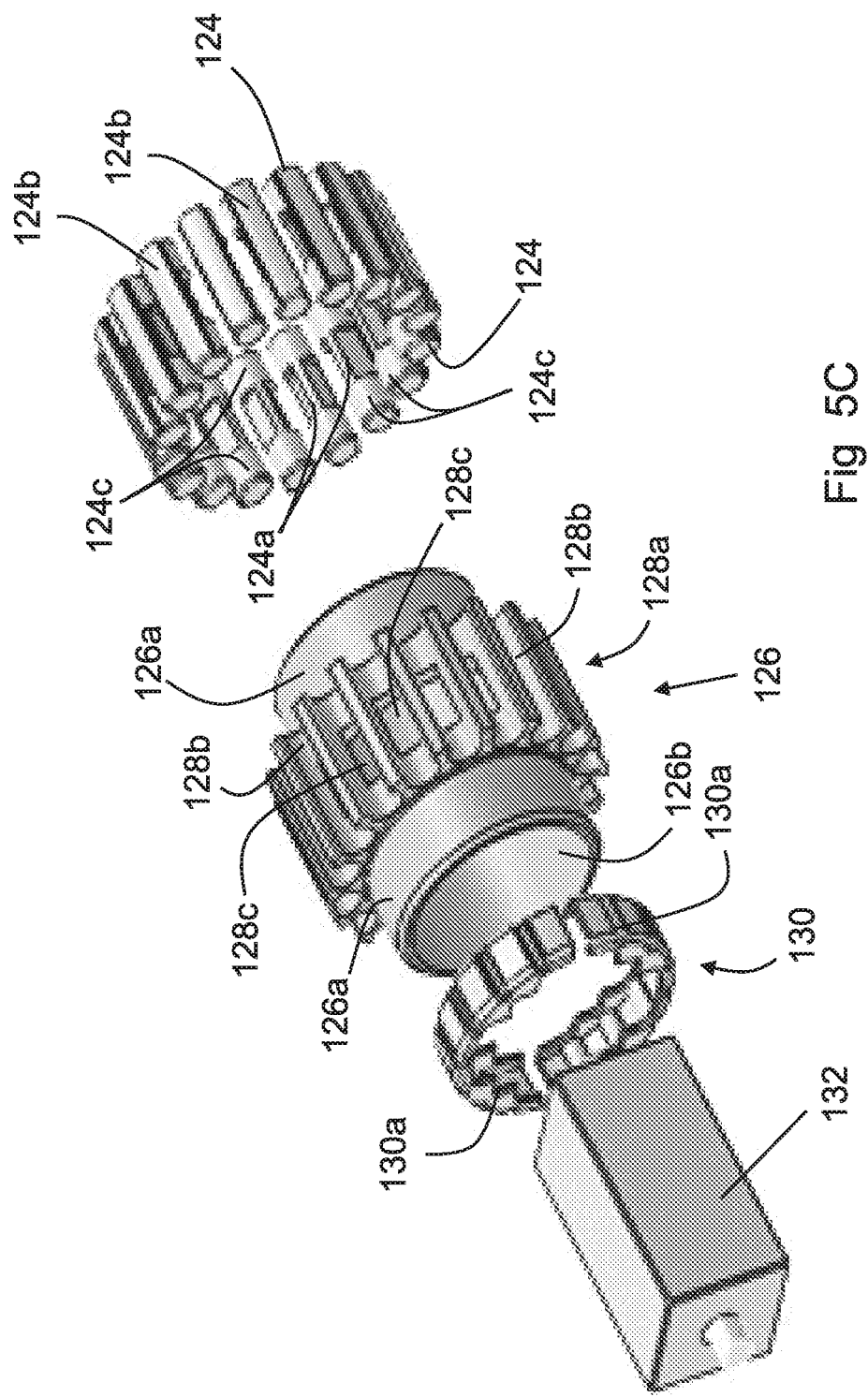
FIG. 5C is an enlarged, exploded view of a portion of the dynamic rotary locking member of FIG. 5B.
Figure 6F:
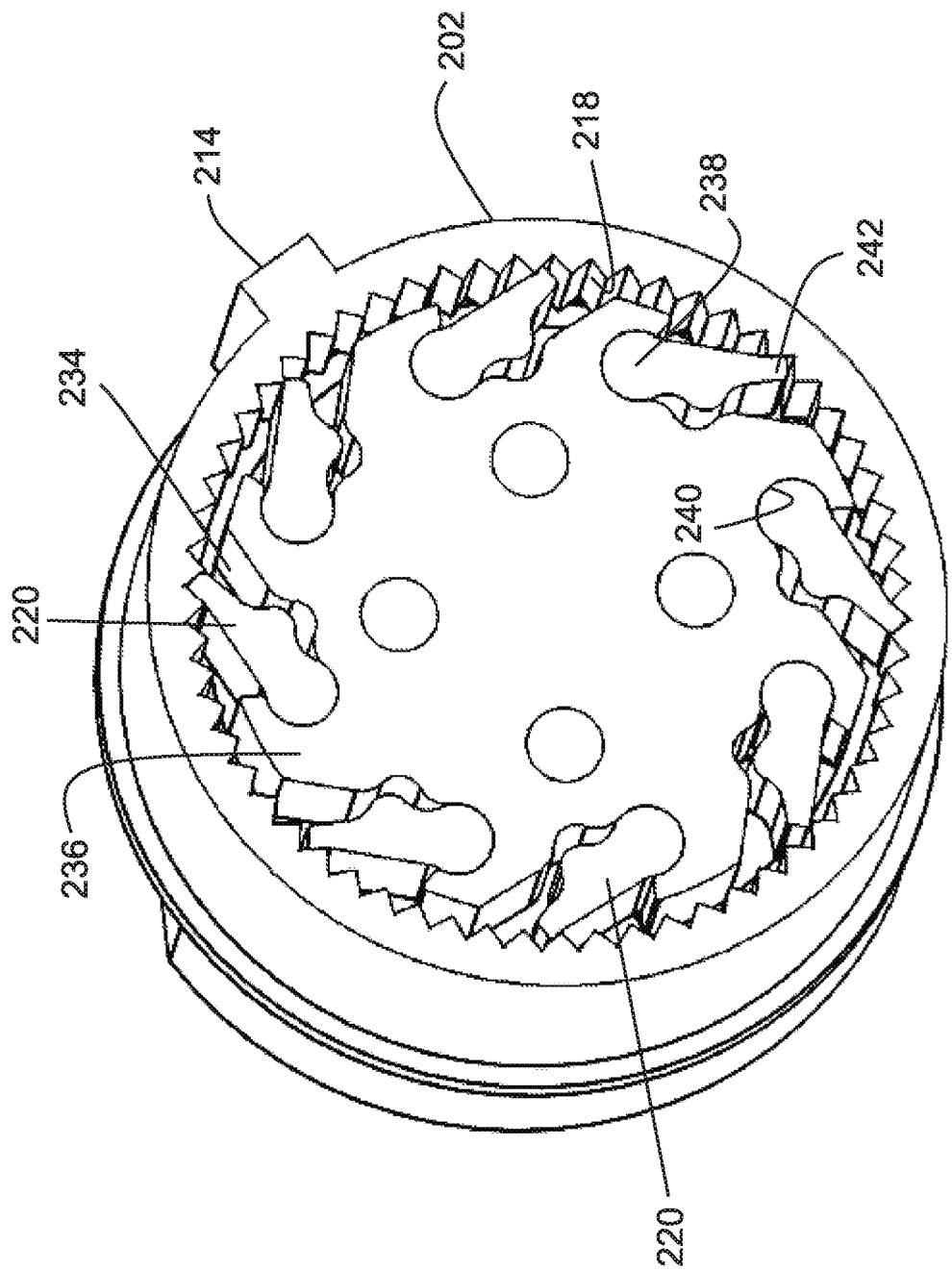
FIG. 6F is a cross sectional, perspective view of the assembled locking member of FIG. 6A.

Referring now to FIGS. 3A-3C, there is illustrated a first embodiment of the dynamic rotary locking member 20 mounted to a caster arm 18. In the illustrated embodiment, the locking member 20 includes an outer race 22 encircling a plurality of pivotally mounted sprag elements 24. An inner race 26 includes a plurality of pivot axles 28 that support the sprag elements 24 for movement. Extending through the center of the locking member 20 is an actuator 30. The actuator 30 includes a drive mechanism 32, which may be an electric motor and output shaft, such as a stepper motor or other controllable rotational device, and a drive element 34, shown as a gear and moved by the drive mechanism 32. Each of the sprag elements 24 has a driven portion 36, illustrated as a tooth segment, that engages the gear 34. The sprag elements 24 have a contact surface 38 that is selectively brought into contact with an inner surface 22a of the outer race 22 by the actuator 30, as shown in FIG. 3C.

The profile of the sprag elements 24, and the contact surface 38, have a contour that is generally asymmetric and having a major diameter and a minor diameter that pass through the rotational center of the element. The major diameter is larger than the distance between the pivot axles 28 and the inner surface 22a of the outer race 22 in order to provide contact and a wedging fit to cause the outer race 22 to lock to the inner race 26.

Because the inner surface 22a and the contact surface 38 are generally smooth, the outer race 22 and the caster arm 18 can be locked in any number of positions. The contact surface 38 is also disengaged from the inner surface 22a by the actuator 30, also known as the lift-off position as shown in FIG. 3B. The sprag elements 24 may include a stop 40 to limit movement in the lift-off position of FIG. 3B in order to minimize the amount of actuation (and the associated response time) necessary to engage the contact surfaces 38 with the inner surface 22a of the outer race 22. The locking member 20 further includes bearing elements 42, illustrated as plain or sliding bearings though any type of rolling element bearing may be used, to support the outer race 22 for movement relative to the inner race 26.

In operation of the caster arm environment, the inner race 26 is fixed to the frame 12 of the wheelchair 10 (or any structure of another apparatus to which relative movement of the outer race is controlled). The caster arm 18 is mounted onto the outer race 22 or may form part of the outer race for concurrent movement therewith. The caster arm 18 and outer race 22 assembly are free to pivot about the bearing elements 42 and relative to the frame 12 in order to follow undulations or discontinuities on the pathway traveled. When motion of the frame 12 exceeds a threshold, such as movement creating a perceived tipping sensation, the actuator 30 drives the contact surfaces 38 of the sprag elements 24 into engagement with the inner surface 22a of the outer race 22 to stop further rotational movement of the caster arm 18 relative to the frame 12. When the feedback signals from a sensor or sensing device, such as an accelerometer, inclinometer or other device, indicate that the frame movement has been stabilized the actuator 30 disengages the sprags 24 from the outer race 22 to permit continued movement of the caster arm 18.

Referring now to FIGS. 4, and 5A-5C, there is illustrated a second embodiment of a dynamic rotary locking member, shown generally at 120, mounted to a caster arm 118 by way of a mounting aperture 118a. The locking member 120 includes an outer race 122 encircling a plurality of pivotally mounted sprag elements 124. As shown in FIG. 4, the caster arm 118 is mounted onto the outer race 122 for concurrent movement therewith or may form part or all of the outer race. An inner race 126 includes a cage section 128a that supports and maintains the relative position and orientation of the sprag elements 124 while permitting rotational movement of the sprag elements 124. The cage section 128a is formed by spaced sprag carriers 128b that support the sprag elements 124 and a drive window 128c formed through the inner race 126 and opening into each sprag carrier 128b. Alternatively, the cage section 128a may be a separate component positioned on or near the outer surface of the inner race 126. In the illustrated embodiment, the sprag carriers 128b have a shape that generally conforms to the shape of the sprag elements 124 creating a surface contact between the two structures. Alternatively, the sprag carriers 128b may have a different configuration, such as straight sides forming a line contact pattern or even a point contact pattern if so desired. The drive window 128c may be a single opening extending around the circumference of the inner race or may be a plurality of discrete windows formed with each sprag carrier 128b. The inner race 126 includes at least one load surface 126a, two are shown adjacent to the cage section 128a in FIGS. 5B and 5C.

An actuation sleeve 130 is configured to fit within the drive window 128c and includes a sprag engagement profile 130a that mates with a corresponding drive profile 124a of the sprag element 124. In the illustrated embodiment, the drive profile 124a has a generalized tooth form that mates with the sprag engagement profile 130a having a generalized slotted profile. Other geometric forms may be used if so desired. The sprag elements further include an upper contact surface 124b that engages an inner surface of the outer race 122 and a lower contact surface 124c that engages the load surface 126a of the inner race 126. The actuation sleeve 130 is collapsible to fit through an inner diameter opening 126b of the inner race 126 and is expandable in order to engage the drive window 128c. The actuation sleeve 130 further includes a drive element 130b that is configured to transmit rotary motion from a drive mechanism 132, such as an electric motor or a driving connection to a remote motor, to the sprag elements 124.

The profile of the sprag elements 124, including the upper contact surface 124a and the lower contact surface 124c, have a contour that is generally asymmetric and having a major diameter and a minor diameter that pass through the rotational center of the element. The major diameter is larger than the distance between the load surface 126a and an inner surface 122a of the outer race 122 in order to provide contact and a wedging fit to cause the outer race to lock to the inner race. The minor diameter is smaller than the distance between the load surface 126a and the inner surface of the outer race 122 in order to provide lift off between the surfaces to unlock the member 120.

The locking member 120 includes at least one bearing element 134 and is illustrated having two bearing elements 134 that are plain bearings, though any type of bearing element may be used. Inner and outer end caps 136a and 136b, respectively, may be included along with mounting hardware 136c, illustrated as bolts, to contain the components of the locking member 120 and secure it to the frame 12.

Referring now to FIGS. 6A-6F there is illustrated a third embodiment of a dynamic rotary locking member, shown generally at 200. The locking member 200 includes an outer race 202, a locking assembly, shown generally at 204, an inner race assembly, shown generally at 206, an end cap 208, an actuator 210, and a pair of spaced-apart bearing elements 212. The outer race 202 is illustrated having an outer surface with a torque transmitting feature of an integral key 214, though other features such as splines or multi-sided geometries may be used. Alternatively, the outer surface may be smooth and rely on a press fit or interference fit for assembly with a mating component such as a caster arm. The inner surface of the outer race 202 includes bearing surfaces 216 configured to mate with portions of the bearing elements 212 and a locking spline section 218. The locking spline section 218 extends around the entire circumference of the inner surface.

The locking assembly 204 includes a plurality of pawls 220 and a pawl actuator 222. The pawl actuator 222 has a drive hub 224 that engages the actuator 210 for rotational movement relative to the outer race 202. At least one stop window 226 (four are shown) is formed through the pawl actuator and engages a corresponding stop lug 228 extending from the end cap 208. Alternatively, the stop windows 226 and stop lugs 228 may be transposed or configured other than as depicted. The stop windows 226 are larger than the stop lugs 228 to permit movement of the pawl actuator 222 relative to the end cap 208 in order to actuate the pawls 220. The pawl actuator 222 includes a pawl driver 230, illustrated as a slot with a radially oriented component and a circumferentially oriented component, associated with each pawl 220. A pawl driving element 232, illustrated as a driving pin, extends into the pawl driver 230. As the pawl actuator 222 is rotated by the actuator 210, the slot 230 causes the pin 232 and the pawl 220 to move radially toward and away from the locking spline section 218. The rotational movement of the pawl actuator 222 is limited by the size difference between the stop windows 226 and the stop lugs 228.

The pawls 220 are positioned in pockets 234 of a cage portion 236 of the inner race assembly 206. The pawls 220 have a pivot 238 that are supported for pivotal movement in a corresponding pivot seat 240 of the cage 236. The pivot seat 240 of the pawls pockets 234 may be configured to limit any circumferential movement of the pawls and permit predominantly pivoting motion. The pawls 220 further include a latch face 242 that engages the spline teeth 218. In the illustrated embodiment shown in FIG. 6F, the spacing of the teeth 218 relative to the pawls 220 permits a staggered engagement of at least one of the pawls 220 to create finer level of angular locking of the outer race 202. This embodiment provides a stepped or indexed positioning of a caster arm relative to a wheelchair frame. As shown, the latch face 242 of the pawls 220 is a single wedge having the general profile of the tooth space of the spline section 218. Alternatively, the latch face 242 may be any suitable form including one or more teeth.

Referring now to FIGS. 7A, 7B, 8, and 9, there is illustrated a fourth embodiment of a dynamic rotary locking member, shown generally at 300. The locking member 300 shares some general features of the locking member 200, described above. The locking member 300 includes an outer race 302 illustrated having an outer surface with a torque transmitting feature of an integral key 302a, though other features such as splines or multi-sided geometries may be used. Alternatively, the outer surface may be smooth and rely on a press fit or interference fit for assembly with a mating component such as a caster arm. The inner surface of the outer race 302 includes at least one bearing surface 304 configured to mate with portions of a bearing element 306. Similar to the embodiment of the locking member 200, described above, two spaced-apart bearing elements 306 may be used. The outer race 302 further includes a locking spline section 308. The locking spline section 308 extends around the entire circumference of the inner surface of the outer race 302.

At least one pawl 310, and preferably a plurality of pawls 310 (four are illustrated), are positioned in corresponding pawl pockets 312 that cooperate to form a pawl cage 314 of an inner race assembly 316. The pawl pockets 312 further define a pawl pivot seat 318, similar to the pivot seat 240 described above. The pawls 310 are each supported by a pivot 320 for pivotal movement in corresponding pivot seats 318 of the cage 314. The pivot seats 318 of the pawls pockets 312 may be configured to limit any circumferential movement of the pawls and permit predominantly pivoting motion. The pawls 310 each further include a latch face 322 that engages the spline teeth 308. In the illustrated embodiment shown in FIG. 8, the spacing of the teeth 308 relative to the latch faces 322 permits a staggered engagement of at least one of the pawls 310 to create finer level of angular locking of the outer race 302. This embodiment also provides a stepped or indexed positioning of a caster arm relative to a wheelchair frame. As shown, the latch face 322 has the general profile of two teeth that are configured to mate with corresponding tooth spaces of the spline section 308. The latch faces 322 of the various pawls 310 may be staggered, if desired, to provide a finer engagement resolution.

The locking member 300 includes an actuator assembly, shown generally at 330. The actuator assembly 330 includes a coil pack 332 associated with each of the pawls 310 or one coil pack associated with all of the pawls 310. Alternatively, the coil pack 332 may be an electromagnet. The coil pack or packs 332 are formed around a lamination stack 334 that includes a central base 334a and a leg 334b terminating in a pawl stop 334c. The coil packs 332 are energized to create a magnetic field directed through the legs 334b and the pawl stop 334c. The pawls 310 are ferrous based or have a ferrous component (such as a button, strip, band, or coating) such that the magnetic field pulls each pawl from engagement with the locking spline section 308 and against the force of a spring 336, shown in FIG. 9, which keeps the pawls forced against the locking spline section 308. In the illustrated embodiment, the spring 336 is a hairpin spring that seats in the pocket 318 and acts on the pawl 310. The spring 336 may be any suitable spring seated against any appropriate features of the locking member 300, including a coil spring, torsion spring, leaf spring, conical spring, and the like.

Referring now to FIGS. 10 and 11, there is illustrated another embodiment of a dynamic rotary locking member that is axially actuated into and out of engagement. FIG. 10 illustrates a locking member, shown generally at 400, where a bearing 402 is a separate component that engages a portion of the locking member. The bearing 402 may include a mating tooth form similar to the locking hub 412, as will be described below, or a press-fit attachment. FIG. 11 illustrates a variation where a locking member 450 includes an integrally formed bearing 452. As shown in FIG. 10, the locking member 400 includes two sections, a first section or grounding hub 410 and a second section or locking hub 412 that is axially moveable relative to the grounding hub 410. The grounding hub 410 is fixed to or integrally formed with a frame, such as a wheelchair frame, or other structure that supports a caster arm 440 or other moveable component for relative movement thereto. It should be understood that only an operative portion of the caster arm 440 is illustrated in FIG. 11 and that an extending arm supporting a caster wheel, as is well known in the art, would be part of the structure. The locking hub 410 may be supported for rotational and axial movement on a shaft extending from the frame or the grounding hub 410 through an inner aperture of the locking hub 412. The shaft is schematically represented by dashed centerline A in FIG. 10, which is also applicable to the structure in FIG. 11.

The grounding hub 410 and locking hub 412 each have at least one, and preferably a plurality of locking teeth 414, radially distributed over mating faces of the grounding hub 410 and locking hub 412. The locking teeth 414 are illustrated as triangular tooth forms configured to lock in one direction and permit rotational movement of the locking hub 412 relative to the grounding hub 410 in the other direction. The tooth form of the locking teeth 414 has an abutment face 414a that prevents the movement in one direction and a ramp face 414b that permits rotation of the locking hub 412. The ramp face 414b may react against the force of a spring 416 or resilient member to permit movement of a caster arm, as shown in FIG. 11. In the illustrated embodiment, the orientation of the ramp face 414b and the abutment face 414a are handed, left and right, such that the resulting movement of the caster arm is the same from side to side, though such is not required. Alternatively, the tooth form of the locking teeth 414 may be configured to lock in both rotational directions. Such a tooth form may be rectangular, trapezoidal, serrated, triangular, and the like where mating surfaces require axial separation of the locking hub 412 from the grounding hub 410 in order to permit movement.

The locking hub 412 is mechanically coupled to the caster arm 440 as shown in FIG. 11. As shown in FIGS. 10 and 11, the locking hub 412 has a torque transmitting profile illustrated as a plurality of teeth 418a extending about the outer circumferential surface. These teeth 418a are configured to engage corresponding teeth 418b of the caster arm 440. The engagement of teeth 418a and 418b is such that the locking hub 412 is able to slide relative to the caster arm 440. Alternatively, the outer surface of the locking hub 412 and the mating inner surface of the caster arm 440 may have any suitable torque transmitting profiles permitting relative axial movement such as, for example, lobes, flats, or geometric shapes such as oval, triangular, square, hexagonal, and the like. The caster arm 440 is illustrated having a bearing support diameter 442 that contacts the bearing 402 or 452 to support rotational movement of the caster arm during use. During normal use, the locking hub 412 is disengaged form the grounding hub 410 so that the caster arm can respond to surface irregularities and react against a suspension system (not shown).

Referring now to FIG. 11, the locking hub 412 can be moved into and out of engagement with an actuator 420, illustrated as an electromagnetic coil. The actuator 420 may be configured as a solenoid, a hydraulic or pneumatic actuator, or a mechanical linkage arrangement such as a Bendix-style drive associated with automotive type starter mechanisms. In the illustrated embodiment, the coil 420 is actuated in response to a sensor signal, as described above. When energized, the actuator 420 draws the locking hub 412 into engagement with the grounding hub 410 and against the force of the spring 416. Alternatively, the spring force from spring 416 may maintain engagement and actuator 420 may be energized to release the locking hub 412.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A selectively locking rotational coupling comprising:
   a first coupling member fixedly supported relative to a frame, the first coupling member supporting at least one locking element;
   a second coupling member supported for rotation relative to the frame and the first coupling member, the second coupling member moveable relative to the at least one locking member; and
   an actuator responsive to a signal and configured to selectively move the at least one locking member between the first coupling member and the second coupling member to engage the at least one locking member therebetween such that the second coupling member is rotationally fixed relative to the frame.

2. The selectively locking rotational coupling of claim 1 wherein the first coupling member is one of an inner race or an outer race and the second coupling member is the other of the inner race or outer race, the inner and outer races arranged in at least a partially overlapping relationship, and the at least one locking element is a sprag element, the sprag element having an upper contact surface that engages an inner surface of the outer race and a lower contact surface that engages a load surface of the inner race.

3. The selectively locking rotational coupling of claim 2 wherein the actuator moves the sprag element relative to at least one of the inner race or outer race in response to the signal causing the sprag element to wedge between the inner surface and the load surface to fix the second coupling member relative to the frame.

4. The selectively locking rotational coupling of claim 3 wherein the sprag element is a plurality of sprag elements that are each supported in a spaced relationship relative to each other, the inner race including at least one access port permitting the actuator to articulate the plurality of sprag elements into engagement with the inner surface and the load surface, and the signal being proportional to an acceleration or deceleration component of the frame.

5. The selectively locking rotational coupling of claim 1 wherein the at least one locking element is a plurality of locking elements and the first coupling member includes a plurality of pivot axles that pivotally support the plurality of locking elements, and the actuator engages a portion of the locking elements for movement into and away from engagement with the second coupling member.

6. The selectively locking rotational coupling of claim 5 wherein the plurality of locking elements include a tooth segment and a stop to limit movement of the locking elements away from engagement, and the actuator includes a gear that engages the tooth segment for movement of the plurality of locking elements into and out of engagement with the second coupling member.

7. The selectively locking rotational coupling of claim 5 wherein the second coupling member is coupled to a caster arm of a wheelchair and the signal is proportional to an acceleration or deceleration component of the frame.

8. The selectively locking rotational coupling of claim 5 each of the plurality of locking elements has a contact surface that is selectively brought into contact with an inner surface of the second coupling member by the actuator, the contact surface includes an asymmetric profile defined by a major diameter and a minor diameter that pass through the pivot axles, the major diameter being larger than the distance between the pivot axles and the inner surface of the second coupling member.

9. The selectively locking rotational coupling of claim 1 wherein the locking element is at least one pawl having a pivot and a latch face, the first coupling member has at least one pivot seat, the at least one pivot seat supporting the pivot for selective pivotal movement of the pawl, and the second coupling member includes a surface defining a plurality of spline teeth that are configured to mate with the latch face.

10. The selectively locking rotational coupling of claim 9 wherein the at least one pawl includes a drive pin and the actuator includes an electric motor responsive to the signal and a pawl driver configured as a slot having a radial oriented component and a circumferentially oriented component, the pawl driver being rotated by the electric motor to actuate the latch face into and out of engagement with at least one of the plurality of spline teeth.

11. The selectively locking rotational coupling of claim 9 wherein the at least one pawl includes a ferrous component and the actuator is one of a coil, an electromagnet, or a lamination stack having a central base and a leg terminating in a pawl stop, the actuator being energized in response to the signal to move the latch face into or out of engagement with at least one of the plurality of spline teeth.

12. The selectively locking rotational coupling of claim 9 wherein the at least one pawl is a plurality of pawls, each pawl having a pivot and a latch face, the at least one pivot seat is a plurality of pivot seats, and wherein at least one of the plurality of pivot seats is circumferentially offset from the other pivot seats such that the engagement of the latch face of one pawl with the plurality of spline teeth is staggered with engagement of at least one of the other plurality of pawls.

13. A selectively locking rotational coupling comprising:
   a first coupling member fixedly supported relative to a frame, the first coupling member supporting at least one locking element;
   a second coupling member supported for rotation relative to the frame and the first coupling member, the second coupling member moveable relative to the first coupling member to engage the at least one locking member, the first and second coupling members each have a side facing the other coupling member, the at least one locking element is at least one locking tooth on the first coupling member side and a mating locking tooth on the second coupling member side; and an actuator configured as one of a solenoid or an electromagnetic coil responsive to a signal and configured to selectively move the second coupling member relative to the first coupling member and engage the at least one locking member therebetween such that the second coupling member is rotationally fixed relative to the frame.

14. The selectively locking rotational coupling of claim 13 wherein a resilient member engages at least one of the first or second coupling members and the actuator reacts against the spring force to cause one of an engagement of the locking teeth or a disengagement of the locking teeth.

15. The selectively locking rotational coupling of claim 13 wherein the first coupling member includes a bearing that engages a caster arm for rotational movement, the second coupling member includes a torque transmitting profile that slidably engages a torque transmitting profile of the caster arm, the first and second coupling member sides include a plurality of locking teeth, the resilient member extends between the first and second coupling members such that actuator moves the second coupling member into engagement with the first coupling member to prevent rotational movement of the caster arm in at least one rotational direction.

16. The selectively locking rotational coupling of claim 15 wherein the plurality of locking teeth of the first and second coupling members are configured to prevent rotational movement of the caster arm in both a clockwise rotational direction and a counterclockwise rotational direction.

17. A wheelchair comprising:
a frame and a pair of spaced-apart caster arms;
a first coupling member fixedly supported relative to the frame, the first coupling member supporting at least one locking element;
a second coupling member supported for rotation relative to the frame and coupled to the caster arm, the second coupling member moveable relative to the first coupling member to engage the at least one locking member; and
an actuator responsive to a signal and configured to selectively move the second coupling member relative to the first coupling member and engage the at least one locking member therebetween such that the second coupling member is rotatively fixed relative to the frame.

18. The wheelchair of claim 17 wherein the first coupling member is an outer race and the second coupling member is an inner race, the inner and outer races are arranged in at least a partially overlapping relationship, and the at least one locking element is a plurality of sprag elements, each of the plurality of sprag elements having an upper contact surface that engages an inner surface of the outer race and a lower contact surface that engages a load surface of the inner race, the inner race including at least one access port permitting the actuator to articulate the plurality of sprag elements into engagement with the inner surface and the load surface, and the signal being proportional to an acceleration or deceleration component of the frame.

19. The wheelchair of claim 17 wherein the at least one locking element is a plurality of locking elements, each locking element includes a tooth segment and a stop to limit movement of the locking elements away from engagement, and the first coupling member includes a plurality of pivot axles that pivotally support the plurality of locking elements, and the actuator includes a gear that engages the tooth segment for movement of the plurality of locking elements into and out of engagement with the second coupling member and the signal is proportional to an acceleration or deceleration component of the frame.

20. The wheelchair of claim 17 wherein the first and second coupling members each have a side facing the other coupling member, the at least one locking element is a plurality of locking teeth on the first coupling member side and a plurality of mating locking teeth on the second coupling member side, and the actuator is one of a solenoid or an electromagnetic coil, the first coupling member includes a bearing that engages at least one of the spaced-apart caster arms for rotational movement, the second coupling member includes a torque transmitting profile that slidably engages a torque transmitting profile of the at least one of the spaced-apart caster arms, a resilient member extends between the first and second coupling members such that actuator moves the second coupling member into engagement with the first coupling member to prevent rotational movement of the caster arm in at least one rotational direction.

* * * * *